United States Patent [19]

Zolk et al.

[11] Patent Number: 4,857,613

[45] Date of Patent: Aug. 15, 1989

[54] PREPARATION OF HOMOPOLYMERS AND COPOLYMERS OF PROPENE USING A ZIEGLER-NATTA CATALYST SYSTEM

[75] Inventors: Ralf Zolk, Hessheim; Juergen Kerth, Carlsberg; Rainer Hemmerich, Gruenstadt, all of Fed. Rep. of Germany

[73] Assignee: BASF Akteingesellschaft, Ludwigshafen, Fed. Rep. of Germany

[21] Appl. No.: 236,213

[22] Filed: Aug. 25, 1988

[30] Foreign Application Priority Data

Sep. 8, 1987 [DE] Fed. Rep. of Germany ....... 3730022

[51] Int. Cl.$^4$ ................................................ C08F 4/64
[52] U.S. Cl. .................................. 526/128; 526/125; 526/351; 502/107; 502/127; 502/125
[58] Field of Search ................................. 526/125, 128

[56] References Cited

U.S. PATENT DOCUMENTS

4,568,658 2/1986 Cook et al. ........................... 502/107

FOREIGN PATENT DOCUMENTS

| | | |
|---|---|---|
| 0014523 | 10/1980 | European Pat. Off. . |
| 0045977 | 2/1982 | European Pat. Off. . |
| 0173485 | 6/1985 | European Pat. Off. . |
| 0195497 | 1/1986 | European Pat. Off. . |
| 0171200 | 2/1986 | European Pat. Off. . |
| 0206172 | 12/1986 | European Pat. Off. . |
| 0208524 | 1/1987 | European Pat. Off. . |
| 2049709 | 12/1980 | United Kingdom . |
| 2101609 | 1/1983 | United Kingdom . |
| 2101611 | 1/1983 | United Kingdom . |

OTHER PUBLICATIONS

European Search Report.

*Primary Examiner*—Patrick P. Garvin
*Attorney, Agent, or Firm*—Keil & Weinkauf

[57] ABSTRACT

Polymers of propene are prepared using a Ziegler-Natta catalyst system consisting of (1) a titanium component which is based on a finely divided, shape-imparting silica gel and contains titanium, magnesium, chlorine and a benzenecarboxylic acid derivative, (2) an aluminum component and (3) a silane component. In the process, a titanium component (1) is employed which is obtained by (1.1) first preparing (I) a carrier from (Ia) a silica gel which has a relatively high moisture content, (Ib) an organomagnesium compound and (Ic) a gaseous chlorinating agent by a method in which (1.1.1) first (Ia) is reacted with (Ib), (1.1.2) then (Ic) is passed into the mixture obtained in (1.1.1), and (I) is isolated, (1.2) thereafter a solid-phase intermediate is prepared from (I), (II) an alkanol, (III) titanium tetrachloride and (IV) a phthalic acid derivative by a procedure in which (1.2.1) first (I) is reacted with (II), (1.2.2) then (III) is introduced into the mixture resulting from (1.2.1), with the proviso that (IV) is also introduced during (1.2.1) and/or (1.2.2), (1.3) then the solid-phase product resulting from (1.2) is extracted with titanium tetrachloride or a titanium tetrachloride/hydrocarbon mixture, and (1.4) finally the solid-phase product resulting from (1.3) is washed with a liquid hydrocarbon.

3 Claims, No Drawings

PREPARATION OF HOMOPOLYMERS AND COPOLYMERS OF PROPENE USING A ZIEGLER-NATTA CATALYST SYSTEM

The present invention relates to a process for the preparation of homopolymers of propene and copolymers of propene with minor amounts of other $C_2$–$C_{12}$-α-monoolefins, in particular $C_2$–$C_6$-α-monoolefins, by polymerization, in particular dry-phase polymerization, of the monomer or monomers at from 20° to 160° C., in particular from 50° to 120° C., under from 1 to 100, in particular from 20 to 70, bar using a Ziegler-Natta catalyst system consisting of (1) a titanium component which is based on a finely divided, shape-imparting silica gel and contains titanium, magnesium, chlorine and a benzenecarboxylic acid derivative, (2) an aluminum component of the formula $$AlR_3$$

where R is alkyl of not more than 8, in particular not more than 4, carbon atoms, and (3) a silane component of the formula $$R^1{}_n Si(OR^2)_{4-n}$$

where $R^1$ is a saturated aliphatic and/or aromatic hydrocarbon radical of not more than 16, preferably not more than 10, carbon atoms, $R^2$ is alkyl of not more than 15, preferably not more than 8, in particular not more than 4, carbon atoms and n is from 0 to 3, preferably from 0 to 2, in particular 1 or 2, with the provisos that the atomic ratio of titanium from the titanium component (1) to aluminum from the aluminum component (2) is from 1:10 to 1:800, in particular from 1:20 to 1:300, and the molar ratio of aluminum component (2) to silane component (3) is from 1:0.01 to 1:0.8, in particular from 1:0.02 to 1:0.5.

Polymerization processes of this type are known; their special feature compared with other similar processes is the specific design of the catalyst system, and processes disclosed in European Laid-Open Applications 0,014,523, 0,045,977, 0,171,200 and 0,195,497 and British Pats. No. 2,101,609 and 2,101,611 may be mentioned as prototypes for the present case.

The specific embodiments of the catalyst systems are provided in order to achieve certain aims, such as the following:

The catalyst system should be easy to prepare and give a high yield of polymer, which must contain a very large isotactic fraction. Moreover, the catalyst system should produce polymers having specific morphological properties, for example uniform particle size and/or a smaller content of very fine particles and/or a high bulk density. In addition to these parameters, which are important for controlling the polymerization system, working up the polymers and/or processing the latter, a low halogen content of the polymer is also important, especially with regard to corrosion problems; this can be achieved by increasing the polymer yield and/or by a catalyst system which contains very little halogen.

Some of these aims can be achieved in the prior art only by very expensive processes or only if other aims are neglected.

For example, European Laid-Open Application No. 0,045,977 describes a catalyst system consisting of active $MgCl_2$, $TiCl_4$ and a phthalic acid derivative. With silica gel as the shape-imparting carrier, the productivity of the catalyst system is, however, unsatisfactory; furthermore, the chlorine content of the polymer is comparatively high.

European Laid-Open Applications Nos. 0,014,523 and 0,171,200 and British Pat. Nos. 2,101,609 and 2,101,611 describe catalyst systems whose titanium component is obtained by treating a solid, inorganic oxide with an organic magnesium compound, a Lewis base and titanium tetrachloride, and in addition a halogenating agent, which is not titanium tetrachloride and/or an organic compound of the metals boron, aluminum, silicon or tin or a boron trihalide or a halogen-containing alcohol must be used. Despite an expensive and tedious preparation procedure, the productivity of the corresponding catalyst system is unsatisfactory.

European Laid-Open Application No. 0,195,497 describes a catalyst system whose titanium component is obtained by treating $SiO_2$ with an organic Mg compound, an alcohol, a Lewis base and $TiCl_4$. In this catalyst system too the productivity is low.

All these and other similar catalyst systems have the common feature that the silica gel used must be anhydrous and furthermore should have a very low content of surface hydroxyl groups. (i) Complicated, time-consuming and expensive thermal drying methods, such as heating for 2 hours at 200° C. followed by heating for 5 hours at 700° C. (for example European Laid-Open Application No. 0,208,524) or heating for from 8 to 10 hours under nitrogen at 800° C. (for example U.S. Pat. No. 4,568,658) or heating for several hours under nitrogen at from 320° to 400° C. (for example British Pat. Nos. 2,101,609 and 2,101,611 and European Laid-Open Application No. 0,014,523) as well as (ii) chemical treatment steps, some of which are carried out in addition to a preceding thermal treatment, in particular treatment with chlorine-containing reagents, such as $PCl_5$ (for example British Pat. No. 2,049,709) or $(CH_3)_3SiCl$ (for example European Laid-Open Application No. 0,206,172), have been described for achieving this. Nevertheless, the catalyst systems prepared using a silica gel pretreated in this manner have only moderate to unsatisfactory productivities and/or an undesirably high chlorine content.

The known processes are therefore unsatisfactory, particularly with regard to good productivity and a low chlorine content in the polymers coupled with high isotacticity and good morphology.

It is an object of the present invention to provide a titanium component which, compared with the prior art processes, has particularly good productivity and at the same time is capable of giving polymers having a low chlorine content, high isotacticity and good morphology.

We have found that this object is achieved by a catalyst system which contains a titanium component (1) prepared from (I) a specific carrier which has been obtained in a defined manner from (Ia) a certainly finely divided silica gel which has a relatively high moisture content, (Ib) a certain organomagnesium compound and (Ic) a certain gaseous chlorinating agent, and (II) a certain alkanol, (III) titanium tetrachloride and (IV) a specifically selected phthalic acid derivative in a particular manner.

The present invention accordingly relates to a process for the preparation of homopolymers of propene and copolymers of propene with minor amounts of other $C_2$–$C_{12}$-α-monoolefins, in particular $C_2$–$C_6$-α-monoolefins, by polymerization, in particular dry-phase polymerization, of the monomer or monomers at from 20° to 160° C., in particular from 50° to 120° C., and under from 1 to 100, in particular from 20 to 70, bar using a Ziegler-Natta catalyst system consisting of (1) a titanium component which is based on a finely divided, shape-imparting silica gel and contains titanium, magnesium, chlorine and a benzenecarboxylic acid derivative,
(2) an aluminum component of the formula $$AlR_3$$

where R is alkyl of not more than 8, in particular not more than 4, carbon atoms, and
(3) a silane component of the formula $$R^1{}_n Si(OR^2)_{4-n}$$

where $R^1$ is a saturated aliphatic and/or aromatic hydrocarbon radical of not more than 16, preferably not more than 10, carbon atoms, $R^2$ is alkyl of not more than 15, preferably not more than 8, in particular not more than 4, carbon atoms and n is from 0 to 3, preferably from 0 to 2, in particular 1 or 2, with the provisos that the atomic ratio of titanium from the titanium component (1) to aluminum from the aluminum component (2) is from 1:10 to 1:800, in particular from 1:20 to 1:300, and the molar ratio of aluminum component (2) to silane component (3) is from 1:0.01 to 1:0.8, in particular from 1:0.02 to 1:0.5.

In the novel process, the titanium component (1) used is one which is obtained by a method in which first (1.1) in a first stage (I), a carrier is prepared from (Ia) a finely divided silica gel which has a particle diameter of from 1 to 1,000, preferably from 5 to 500, in particular from 10 to 200, μm, a pore volume of from 0.3 to 5.0, in particular from 1.0 to 3.0, cm³/g, a specific surface area of from 00 to 1,000, in particular from 200 to 500, m²/g, is of the formula $SiO_2 \cdot a\, Al_2O_3$, where a is from 0 to 2, in particular from 0 to 0.5, and has a moisture content such that it loses from 1 to 20, preferably from 2 to 15, in particular from 4 to 10, % by weight, based on the initial total weight of the silica gel, of water at 1000° C. in the course of 0.5 hour, (Ib) an organomagnesium compound of the formula $Mg\, R^3 R^4$, where $R^3$ and $R^4$ are each $C_2$–$C_{10}$-alkyl, preferably $C_2$–$C_8$-alkyl, and (Ic) a gaseous chlorinating agent of the formula ClZ, where Z is Cl or H, preferably H, by a procedure in which first (1.1.1) in a first sub-stage, the finely divided silica gel (Ia) and the organomagnesium compound (Ib) are combined in an inert liquid hydrocarbon, in particular an alkane, with constant thorough mixing at from 10° to 120° C., in particular from 20° to 100° C., from 1 to 10, in particular from 1.5 to 5, molar parts of the organomagnesium compound (Ib) being used per 10 molar parts of silicon of the silica gel (Ia), and the substances combined are kept at from 20° to 140° C., in particular from 60° to 90° C., for from 0.5 to 5, in particular from 1 to 2, hours, then (1.1.2) in a second sub-stage, the gaseous chlorinating agent (Ic) is passed, with constant thorough mixing and at from −20° to +80° C., in particular from 0° to +60° C., into the mixture obtained in the first sub-stage, from 2 to 40, in particular from 5 to 20, molar parts of the chlorinating agent (Ic) being used per molar part of the organomagnesium compound (Ib), the entire mixture is kept at a temperature in the stated range for from 0.5 to 5 hours, in particular from 0.5 to 1 hour, and the resulting solid-phase product, ie. the carrier (I) is isolated with removal of the liquid phase, thereafter (1.2) in a second stage, a solid-phase intermediate is prepared from (I) the carrier obtained in the first stage, (II) a $C_1$–$C_6$-alkanol, in particular ethanol, (III) titanium tetrachloride and (IV) a phthalic acid derivative of the formula

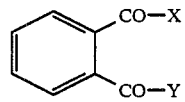

where X and Y together are oxygen or X and Y are each chlorine or $C_1$–$C_{10}$-alkoxy, preferably $C_1$–$C_8$-alkoxy, in particular butoxy, by a procedure in which first (1.2.1) in a first sub-stage, the carrier (I) and the alkanol (II) are combined in an inert liquid hydrocarbon, in particular an alkane, with constant thorough mixing at room temperature, from 1 to 5, in particular from 2.5 to 3.5, molar parts of the alkanol (II) being used per molar part of magnesium of the carrier (I), and the substances combined are kept at from 20° to 140° C., in particular from 70° to 90° C., for from 0.5 to 5, in particular from 1 to 2, hours, then (1.2.2) in a second sub-stage, the titanium tetrachloride (III) is introduced, with constant thorough mixing and at room temperature, into the reaction mixture resulting from the first sub-stage, from 2 to 20, in particular from 4 to 8, molar parts of the titanium tetrachloride (III) being used per molar part of magnesium of the carrier (I), the substances combined are kept at from 10 to 150° C., in particular from 90° to 120° C., for from 0.5 to 5, in particular from 1 to 2, hours and the resulting solid-phase intermediate is isolated with removal of the liquid phase, with the proviso that the phthalic acid derivative (IV) is introduced in the course of one or both of the substages (1.2.1) and (1.2.2), from 0.01 to 1, preferably from 0.1 to 0.4, in particular from 0.25 to 0.35, molar part of the phthalic acid derivative (IV) being used per molar part of magnesium of the carrier (I), then (1.3) in a third stage, the solid-phase intermediate obtained in the second stage is subjected, at from 100 to 150° C., in particular from 115° to 135° C., for from 0.2 to 5, in particular from 1.5 to 3, hours, to a single-stage or multi-stage or continuous extraction with titanium tetrachloride or a mixture of titanium tetrachloride and an alkylbenzene of not more than 12, preferably not more than 10, carbon atoms, in particular ethylbenzene, the said mixture containing not less than 5, in particular not less than 10, % by weight of titanium tetrachloride, and a total of from 10 to 1,000, preferably from 20 to 800, in particular from 40 to 300, parts by weight of the extracting agent being used per 10 parts by weight of the solid-phase intermediate obtained in the second stage, and finally (1.4) in a fourth stage, the solid-phase product formed in the third stage is washed with an inert liquid hydrocarbon, in particular an alkane, until the hydrocarbon contains less than 2, preferably less than 1, % by weight of titanium tetrachloride, and the titanium component (1) is obtained in this manner.

It has been found that the novel process can be carried out with particularly good success if a catalyst system is used whose silane component (3) is of the formula $$R^1_n Si(OR^2)_{4-n}$$

where $R^1$ is phenyl or $C_1$-$C_4$-alkylphenyl, preferably methylphenyl or ethylphenyl, especially p-methylphenyl, $R^2$ is alkyl of not more than 4 carbon atoms, especially methyl or ethyl, and n is 1 or 2.

Regarding the novel process, the following may be stated specifically:

Provided that the defining feature is taken into account, the polymerization process as such can be carried out in virtually any relevant conventional technological embodiment, for example as a batchwise, periodic or, in particular, continuous suspension polymerization or, in particular, dry-phase polymerization process. The abovementioned technological embodiments, ie. the technological variants of the polymerization of α-monoolefins by the Ziegler-Natta method, are well known from the literature and in practice, so that further description is unnecessary.

For the sake of completeness, it may be mentioned that, in the novel process, it is also possible to regulate the molecular weights of the polymers by the relevant conventional measures, for example by means of regulators, in particular hydrogen.

Regarding the composition of the novel catalyst system, the following may be stated specifically: (1) The finely divided silica gel (Ia) to be used for the preparation of the titanium component is in general an aluminosilicate or, in particular, a silica; it is important that it has the required properties. We have found that the commercial silica gels which meet the stated specification and are the relevant conventional ones for carriers are very suitable. It is particularly important that the silica gel has a moisture content such that it loses from 1 to 20, preferably from 2 to 15, in particular from 4 to 10, % by weight, based on the initial total weight of the silica gel, of water at 1000° C. in the course of 0.5 hour (method of measurement: differential thermogravimetry).

The organomagnesium compound (Ib) likewise to be used may be, for example, dibutylmagnesium, dihexylmagnesium or, in particular, butyloctylmagnesium.

The gaseous chlorinating agent (Ic) furthermore to be used should be very dry and pure; it consists of chlorine or, in particular, hydrogen chloride.

The inert liquid hydrocarbon which serves as an assistant may be a hydrocarbon of the type usually combined with titanium components for catalyst systems of the Ziegler-Natta type without causing damage to the catalyst system or its titanium component. Examples of suitable hydrocarbons are pentanes, hexanes, heptanes, gasolines and cyclohexane.

The alkanols (II) to be used for the preparation of the titanium component (1) may be commercial ones; they should advantageously have relatively high purities. Very suitable, for example, are ethanol, n-propyl, isopropyl, n-butyl, isobutyl and tert-butyl alcohol; ethanol is particularly suitable.

The titanium tetrachloride (III) likewise to be used for the preparation of the titanium component (1) should be one which is conventionally used in Ziegler-Natta catalyst systems; the hydrocarbon which may be used as a mixture with the titanium tetrachloride should be very pure and dry.

Furthermore, the phthalic acid derivative (IV) to be used, which is defined in detail above, can be a commercial one; it should advantageously have high purity. We have found that dibutyl phthalate is very particularly suitable for the purpose according to the invention; however, other dialkyl phthalates as well as phthalic anhydride and phthaloyl dichloride are also useful.

The hydrocarbon to be used for the preparation of the titanium component (1) in stage (1.4) can likewise be a conventional one; it should advantageously have a relatively high purity.

The preparation of the titanium component (1) is simple and can be carried out by the skilled worker without explanations. Regarding stages (1.1), (1.2) and (1.3), it is merely necessary to state that the particular resulting solid is advantageously isolated by filtration under suction.

(2) Suitable aluminum components (2) of the stated formula are the relevant conventional ones of this formula; they are sufficiently well known from the literature and in practice that they need not be discussed further. Triethylaluminum may be mentioned as an outstanding typical example.

(3) The silane component (3) which completes the catalyst system is, in particular, a trialkoxyalkylphenylsilane or a dialkyldialkylphenylsilane of the stated formula. Outstanding typical examples are triethoxytoluylsilane and dimethoxyditoluylsilane; other examples are triethoxyethylphenylsilane, trimethoxytoluylsilane and diethoxyditoluylsilane.

The novel process permits the preparation of homopolymers and copolymers, for example binary or ternary copolymers, including block copolymers, of propene with minor amounts of other $C_2$-$C_{12}$-α-monoolefins in an advantageous manner, particularly suitable α-monoolefin comonomers to be polymerized being ethene, but-1-ene, 4-methylpent-1-ene and hex-1-ene; however, other suitable compounds are, for example, n-oct-1-ene, n-dec-1-ene and n-dodec-1-ene.

EXAMPLE 1

Preparation of the titanium component (1)

The procedure is carried out as follows: first (1.1) in a first stage (I), a carier is prepared from (Ia) a finely divided silica gel which has a particle diameter of from 20 to 45 μm, a pore volume of 1.75 cm³/g and a specific surface area of 320 m²/g, is of the formula $SiO_2$ and has a moisture content such that it loses 7.4% by weight, based on the initial total weight of the silica gel, of water at 1000° C. in the course of 0.5 hour (method of measurement: differential thermogravimetry), (Ib) butyloctylmagnesium and (Ic) hydrogen chloride by a procedure in which first (1.1.1) in a first sub-stage, the finely divided silica gel (Ia) and the organomagnesium compound (Ib) are combined in n-heptane with constant thorough mixing by means of stirring at room temperature, 5.0 molar parts of the organomagnesium compound (Ib) being used per 10 molar parts of silicon of the silica gel (Ia), and the substances combined are kept at 90° C., for 1.5 hours, then (1.1.2) in a second sub-stage, the gaseous chlorinating agent (Ic) is passed, with constant thorough mixing by means of stirring at 20° C., into the mixture obtained in the first sub-stage, 10 molar parts of the chlorinating agent (Ic) being used per molar part of the organomagnesium compound (Ib), the entire mixture is kept at a temperature in the stated range for 0.5 hour and the resulting solid-phase product, ie. the carrier (I), is isolated with removal of the liquid phase, thereafter (1.2) in a second stage, a solid-phase intermediate is prepared from (I) the carrier obtained in the first stage, (II) ethanol, (III) titanium tetrachloride and (IV) di-n-butyl phthalate by a procedure in which first (1.2.1) in a first sub-stage, the carrier (I) and the ethanol (II) are combined in n-heptane with constant thorough mixing by means of stirring at room temperature, 3 molar parts of the ethanol (II) being used per molar part of magnesium of the carrier (I), and the substances combined are kept at 80° C., for 1.5 hours then (1.2.2) in a second sub-stage, the titanium tetrachloride (III) is introduced, with constant thorough mixing by means of stirring at room temperature, into the reaction mixture resulting from the first sub-stage, 6 molar parts of the titanium tetrachloride (III) being used per molar part of magnesium of the carrier (I), after which di-n-butyl phthalate is introduced, 0.30 molar part of phthalate (IV) being used per molar part of magnesium of the carrier (I), the mixture obtained in the first sub-stage, ie. the substances combined, is kept at 120° C. for 2 hours with stirring and the resulting solid-phase intermediate is isolated by filtration under suction, with removal of the liquid phase, then (1.3) in a third stage, the solid-phase intermediate obtained in the second stage is subjected, at 125° C., and for 2 hours, to a continuous extraction with a mixture of titanium tetrachloride and ethylbenzene, the said mixture containing 15% by weight of titanium tetrachloride, and 140 parts by weight of the titanium tetrachloride/ethylbenzene mixture being used 10 parts by weight of the solid-phase intermediate obtained in the second stage, after which the resulting solid-phase intermediate is isolated by filtration, and finally (1.4) in a fourth stage, the solid-phase product obtained in the third stage is washed with n-heptane until the n-heptane contains less than 0.3% by weight of titanium tetrachloride, and the titanium component (1) is obtained in this manner; it contains 2.6% by weight of titanium, 9.7% by weight of magnesium and 32.2% by weight of chlorine.

Polymerization

A steel autoclave having a volume of 10 l and equipped with a stirrer is charged with 50 g of polypropene powder, 10 millimoles of aluminumtriethyl (in the form of a 1 molar solution in n-heptane) as aluminum component (2), 1 millimole of triethoxytoluylsilane (in the form of a 1 molar solution in n-heptane) as silane component (3), 5 liters (S.T.P.) of hydrogen and finally 100 g (=0.05 millimole of titanium) of the titanium component (1) described above, at 30° C. The reactor temperature is brought to 70° C. in the course of 10 minutes, and the reactor pressure is brought to 28 bar in this time by forcing in gaseous propene.

The actual polymerization is carried out with constant stirring at 70° C. and under 28 bar in the course of 2 hours, monomer consumed being continuously replaced with fresh monomer.

The productivity of the catalyst component (1), the heptane-soluble fraction (as a measure of the isotacticity) and the particle size distribution of the resulting polymer are summarized in the Table below.

EXAMPLE 2

The procedure described in Example 1 is followed, with the sole exception that the same molar amount of dimethoxyditoluylsilane is used as silane component (3).

The result of this polymerization is likewise shown in the Table below.

COMPARATIVE EXPERIMENT 1

Preparation of the titanium component

The procedure described in Example 1 of European Laid-Open Application No. 0,195,497 is followed.

The titanium component obtained contains 3.6% by weight of titanium, 4.4% by weight of magnesium and 16% by weight of chlorine.

Polymerization

This is carried out as in Example 1, except that, instead of the titanium component described there, the same molar amount of the titanium component defined above is used.

The polymerization result achieved is once again shown in the Table below.

COMPARATIVE EXPERIMENT 2

Preparation of the titanium component

The procedure described in Example 1 is followed, except that the silica gel used is dried for 3 hours at 500° C.

The titanium component obtained contains 2.5% by weight of titanium, 10.2% by weight of magnesium and 33.1% by weight of chlorine.

Polymerization

The polymerization is carried out as in Example 1, except that, instead of the titanium component described there, the same molar amount of the titanium component described above is used.

|  | Productivity (g of PP/g of catalyst) | Heptane-soluble fraction (% by weight) | Particle size distribution (mm) | | | | | Chlorine content in product (ppm) |
|---|---|---|---|---|---|---|---|---|
|  |  |  | <0.25 | 0.25–0.5 | 0.5–1 | 1–2 | >2 |  |
| Example 1 | 17,000 | 1.6 | 4.5 | 6.8 | 28.6 | 58.1 | 2.0 | 19 |
| Example 2 | 19,700 | 1.8 | 3.8 | 6.9 | 25.6 | 61.4 | 2.3 | 16 |
| Comparative Experiment 1 | 3,500 | 4.0 | 3.0 | 29.8 | 54.0 | 12.2 | 1.0 | 46 |
| Comparative Experiment 2 | 16,800 | 1.7 | 14.4 | 13.6 | 33.9 | 35.9 | 2.2 | 19 |

As shown in the Table, the catalyst component from Comparative Experiment 1 has a substantially lower productivity and stereospecificity than the catalyst components from the Examples according to the invention. Comparative Experiment 2 documents the fact that the titanium component prepared with thoroughly heated silica gel has similar productivity but has a dramatically increased content of fine particles.

We claim:-

1. A process for the preparation of a homopolymer of propene or a copolymer of propene with minor amounts of other $C_2$-$C_{12}$-α-monoolefins by polymerization of the monomer or monomers at from 20° to 160° C. and under from 1 to 100 bar using a Ziegler-Natta catalyst system consisting of
   (1) a titanium component which is based on a finely divided, shape-imparting silica gel and contains titanium, magnesium, chlorine and a benzenecarboxylic acid derivative,
   (2) an aluminum component of the formula $$AlR_3$$

where R is alkyl of not more than 8 carbon atoms, and
   (3) a silane component of the formula $$R^1{}_nSi(OR^2)_{4-n}$$

where $R^1$ is a saturated aliphatic and/or aromatic hydrocarbon radical of not more than 16 carbon atoms,
   $R^2$ is alkyl of not more than 15 carbon atoms and n is from 0 to 3,
   with the provisos that the atomic ratio of titanium from the titanium component (1) to aluminum from the aluminum component (2) is from 1:10 to 1:800 and the molar ratio of aluminum component (2) to silane component (3) is from 1:0.01 to 1:0.8, wherein the titanium component (1) used is one which is obtained by a procedure in which first
   (1.1) in a first stage (I), a carrier is prepared from (Ia) a finely divided silica gel which has a particle diameter of from 1 to 1,000 μm, a pore volume of from 0.3 to 5 cm³/g and a specific surface area of from 100 to 1,000 m²/g, is of the formula $SiO_2 \cdot a\, Al_2O_3$, where a is from 0 to 2, and has a moisture content such that it loses from 1 to 20% by weight, based on the initial total weight of the silica gel, of water at 1000° C. in the course of 0.5 hour, (Ib) an organomagnesium compound of the formula $MgR^3R^4$, where $R^3$ and $R^4$ are each $C_2$-$C_{10}$-alkyl, and (Ic) a gaseous chlorinating agent of the formula ClZ, where Z is Cl or H, by a procedure in which first
   (1.1.1) in a first sub-stage, the finely divided silica gel (Ia) and the organomagnesium compound (Ib) are combined in an inert liquid hydrocarbon with constant thorough mixing at from 10 to 120° C., from 1 to 10 molar parts of the organomagnesium compound (Ib) being used per 10 molar parts of silicon of the silica gel (Ia), and the substances combined are kept at from 20° to 140° C. for from 0.5 to 5 hours, then
   (1.1.2) in a second sub-stage, the gaseous chlorinating agent (Ic) is passed, with constant thorough mixing and at from −20° to +80° C., into the mixture obtained in the first sub-stage, from 2 to 40 molar parts of the chlorinating agent (Ic) being used per molar part of the organomagnesium compound (Ib), the entire mixture is kept at a temperature in the stated range for from 0.5 to 5 hours and the resulting solid-phase product, ie. the carrier (I), is isolated with removal of the liquid phase, thereafter
   (1.2) in a second stage, a solid-phase intermediate is prepared from (I) the carrier obtained in the first stage, (II) a $C_1$-$C_8$-alkanol, (III) titanium tetrachloride and (IV) a phthalic acid derivative of the formula

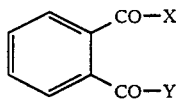

where X and Y together are oxygen or X and Y are each chlorine or $C_1$-$C_{10}$-alkoxy, by a procedure in which first (1.2.1) in a first sub-stage, the carrier (I) and the alkanol (II) are combined in an inert liquid hydrocarbon, with constant thorough mixing at room temperature, from 1 to 5 molar parts of the alkanol (II) being used per molar part of magnesium of the carrier (I), and the substances combined are kept at from 20° to 140° C. for from 0.5 to 5 hours, then
   (1.2.2) in a second sub-stage, the titanium tetrachloride (III) is introduced, with constant thorough mixing and at room temperature, into the reaction mixture resulting from the first sub-stage, from 2 to 20 molar parts of the titanium tetrachloride (III) being used per molar part of magnesium of the carrier (I), the substances combined are kept at from 10° to 150° C. from 0.5 to 5 hours and the resulting solid-phase intermediate is isolated with removal of the liquid phase, with the proviso that the phthalic acid derivative (IV) is introduced in the course of one or both of the substages (1.2.1) and (1.2.2), from 0.01 to 1 molar part of the phthalic acid derivative (IV) being used per molar part of magnesium of the carrier (I), then
   (1.3) in a third stage, the solid-phase intermediate obtained in the second stage is subjected, at from 100° to 150° C. for from 0.2 to 5 hours, to a single-stage or multi-stage or continuous extraction with titanium tetrachloride or a mixture of titanium tetrachloride and an alkylbenzene of not more than 12 carbon atoms, the said mixture containing not less than 5% by weight of titanium tetrachloride, and a total of from 10 to 1,000 parts by weight of the extracting agent being used per 10 parts by weight of the solid-phase intermediate obtained in the second stage, and finally
   (1.4) in a fourth stage, the solid-phase product formed in the third stage is washed with an inert liquid hydrocarbon until the hydrocarbon contains less than 2% by weight of titanium tetrachloride, and the titanium component (1) is obtained in this manner.

2. A process as claimed in claim 1, wherein a catalyst system is used whose silane component (3) is of the formula $$R^1{}_nSi(OR^2)_{4-n}$$

where $R^1$ is phenyl or $C_1$-$C_4$-alkylphenyl, $R^2$ is alkyl of not more than 4 carbon atoms and n is 1 or 2.

3. A process as claimed in claim 2, wherein a catalyst system is used whose silane component (3) is of the formula $$R^1{}_nSi(OR^2)_{4-n}$$

where $R^1$ is methylphenyl or ethylphenyl, $R^2$ is methyl or ethyl and n is 1 or 2.

* * * * *